Patented Apr. 30, 1946

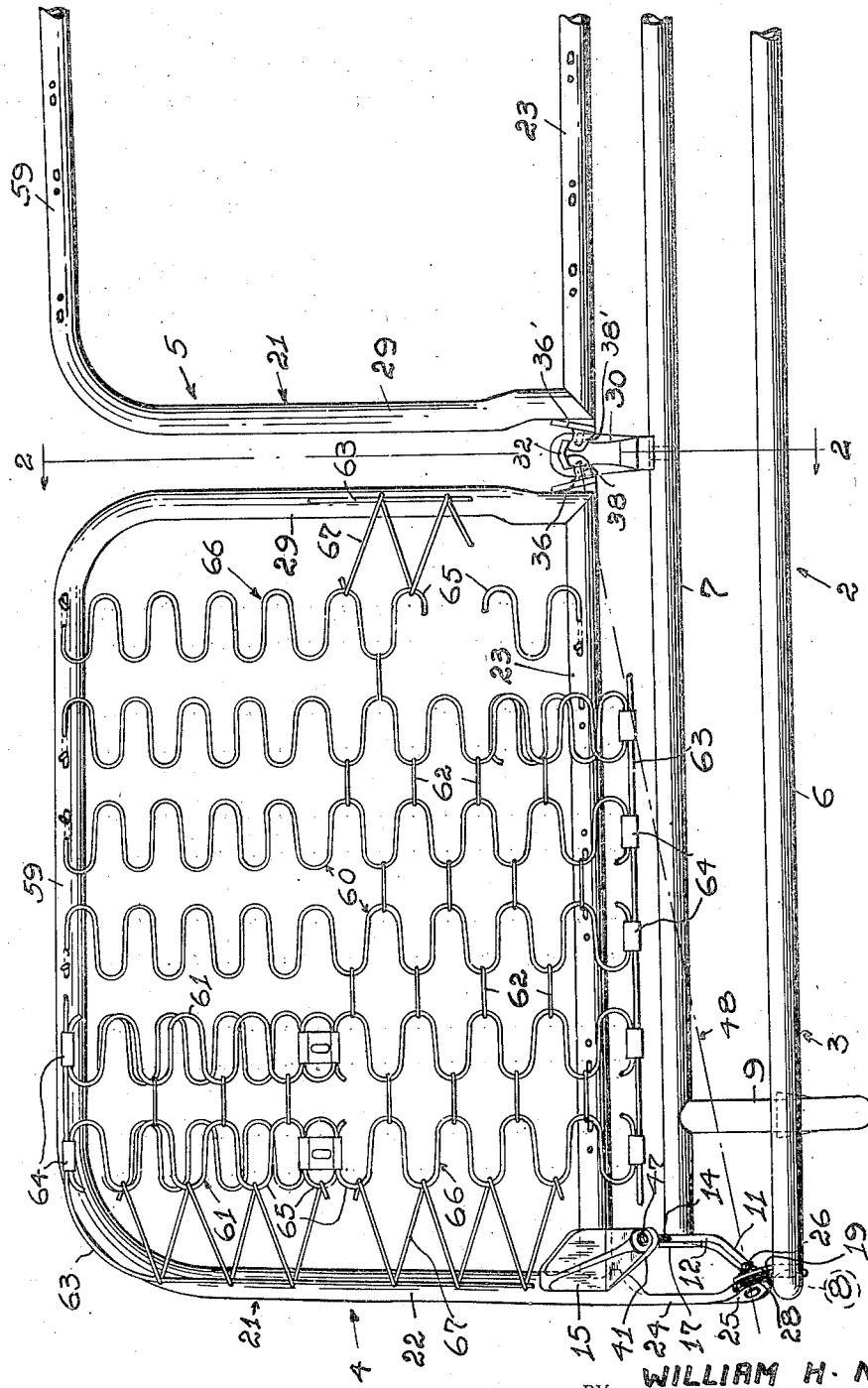

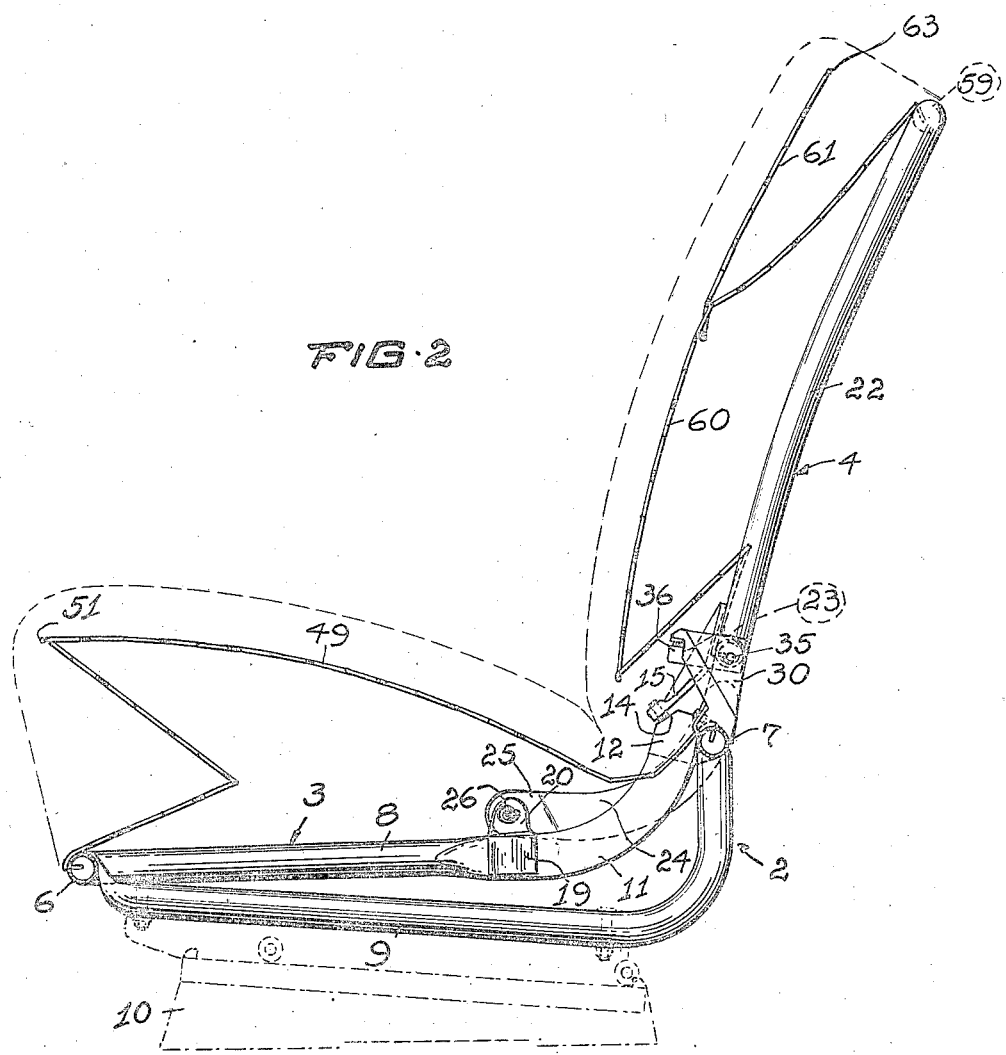
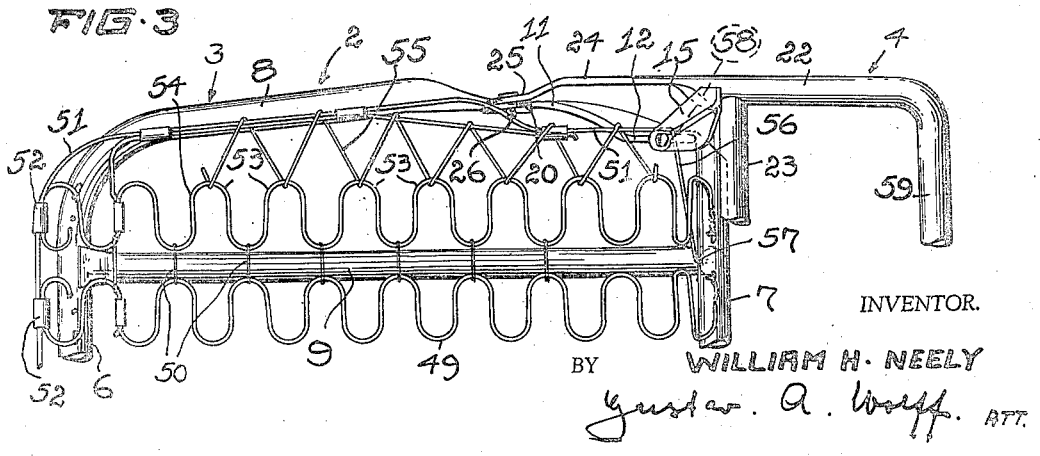

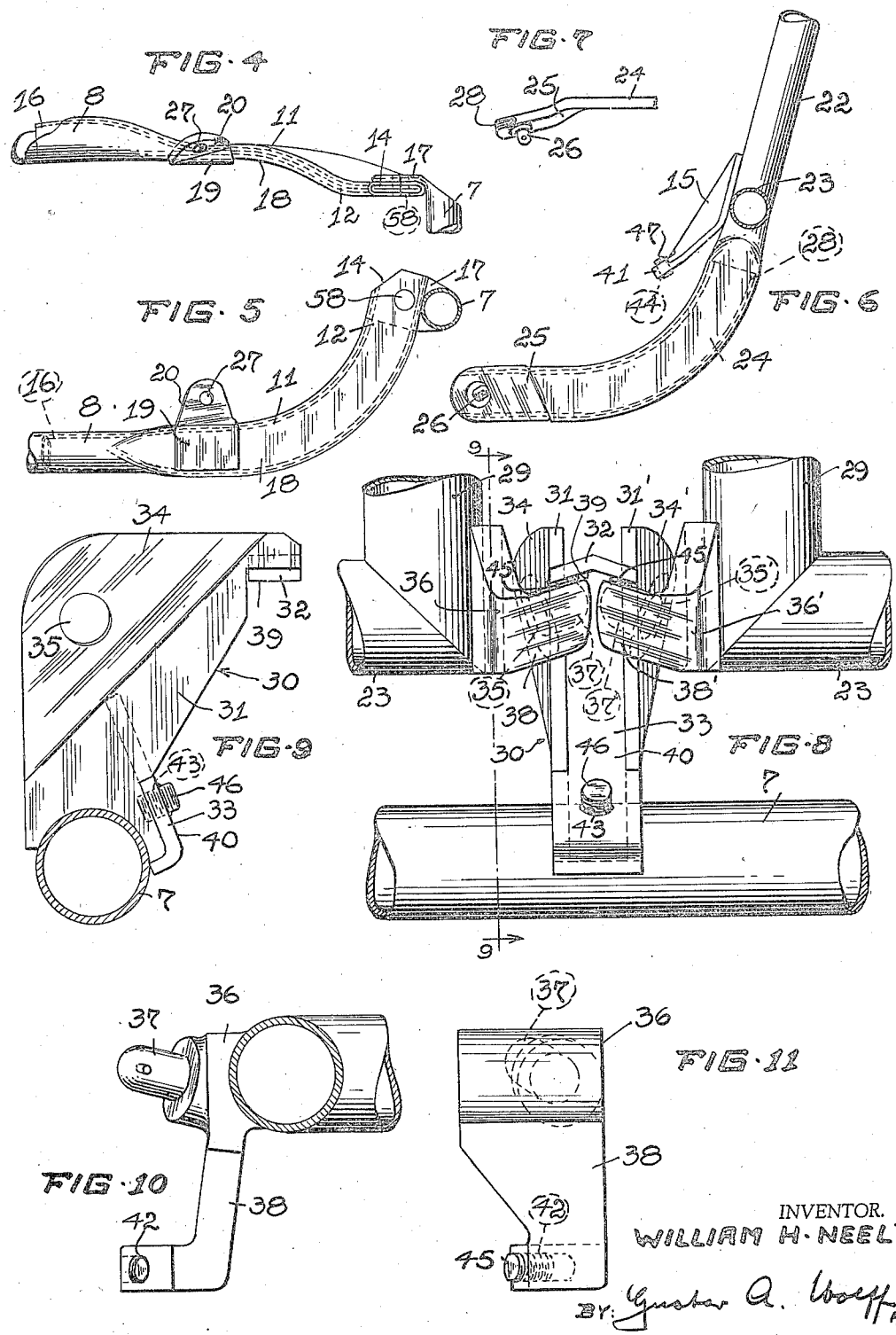

2,399,563

UNITED STATES PATENT OFFICE 2,399,563

FRAME CONSTRUCTION FOR SEAT STRUCTURES

William H. Neely, Cleveland, Ohio, assignor to The Universal Wire Spring Company, Cleveland, Ohio, a corporation of Ohio Application February 21, 1944, Serial No. 523,319

15 Claims. (Cl. 155—5)

This invention refers in general to seat structures for upholstered furniture and, more particularly, to foldable seat structures for use in moving vehicles such as railroad cars, automobiles of the two-door sedan type, etc. Seat structures of this type generally embody a stationary seat member and foldable back members pivoted to said seat member, preferably in symmetrical arrangement with respect thereto to permit folding of these back members on the seat member, and means to arrest the pivotal movement of the back members in predetermined positions. This construction of seat structures, particularly when same are to be used in limited space, such as available in automobiles of the two-door sedan type, necessitates manufacture of small and uncomfortable seat structures, so as to provide the space necessary for free access to the rear seats of such an automobile.

The general object of the present invention is the provision of an improved seat structure adapted for use in automobiles of the two-door sedan type, which structure provides full-fashioned seat capacity and comfort and, in its folded condition, permits free access to the rear seats of this type of automobiles.

Such a general object of the invention is attained by a seat structure in which the frame construction has the back members hinged to the side rails of the seat member at points directly above the side rails and in which the rear portions of the side rails are bent inwardly and upwardly and form stopping means for the back members when in predetermined positions.

Another object of the invention therefore is the provision of a frame construction for a seat structure embodying seat and back frames, in which construction the seat frame is provided with hinge means arranged directly above the side rails, in which the side rails are bent inwardly and upwardly at their rear ends to form stopping or arresting means for the back members and in which these back members include means cooperating with said stopping or arresting means in stopping the back members in predetermined positions.

A further object of the invention is the provision of a frame construction for seat structures of the type described which includes an open tubular seat frame with locally reenforced, flattened and inwardly and upwardly bent side rails providing inwardly and upwardly extended stops and an elevated tubular rear rail with flattened end portions rectangularly offset with respect to the axis of said rail for hugging said side rails adjacent to said stops and rearwardly offsetting the rear rail with respect to said stops.

Still another object of the invention is the provision of a frame construction for seat structures of the type described which embodies improved and reenforced pivotal connections between seat and back frames and specifically constructed means for stopping pivotal movement between seat and back frames in folded and opened up positions.

In addition, the invention has other marked improvements and superiorities which radically distinguish it from presently known structures. These improvements or superior characteristics embodying certain novel features of construction are clearly set forth in the appended claims, and a preferred embodiment of the invention is hereinafter shown with reference to the accompanying drawings forming part of the specification.

In the drawings:

Fig. 1 is a fragmentary front view of a foldable frame construction built in accordance with the invention;

Fig. 2 is a cross section through the frame construction shown in Fig. 1, the section being taken on line 2—2 of Fig. 1;

Fig. 3 is a fragmentary plan view of the frame construction shown in Fig. 1;

Fig. 4 is an enlarged fragmentary plan view of a part of the seat frame; and

Fig. 5 is a side view of Fig. 4;

Fig. 6 is an enlarged fragmentary sectional view of a part of one of the back frames showing the lever arm for pivotally connecting the back frame to the side rail of a seat frame and stopping means secured to the side and bottom rail of the back frame; and Fig. 7 is a fragmentary plan view of the front end of the lever arm shown in Fig. 6;

Fig. 8 is a front view of the bracket pivotally connecting the inner ends of the back frames to the seat frame, the bracket being mounted on the rear rail of the seat frame and the two back frames being in unfolded position;

Fig. 9 is a sectional view on line 9—9 of Fig. 8 without the back frames;

Fig. 10 is a fragmentary side elevation showing a pivot arm secured to its back frame; and Fig. 11 a rear view of the pivot arm shown in Fig. 10.

Referring now in detail to the exemplified form of the structure shown in the drawings, reference numeral 2 denotes a tubular frame construction with a seat frame 3 and two back frames 4 and 5 symmetrically hinged to seat frame 3, as will be described hereinafter. Seat frame 3 embodies front, rear and side rails 6, 7, and 8 respectively, and is reenforced by tubular cross members 9 welded to front and rear rails 6 and 7, which cross members, as customary, are used for mounting the frame construction on supporting means such as shown in dash-dotted lines at 10. The side rails 8 of the seat frame have their rear portions 11 flattened in a vertical plane and bent upwardly and inwardly to form upwardly extended stop members 12. These stop members are formed at their ends with inclined faces 14 cooperating with brackets 15 on back frames 4 and 5 in arresting shifting of these frames when in predetermined positions. Preferably, the flattened end portions of side rails 8 are reenforced by tubular inserts 16 extended into these rails prior to their flattening and bending to provide sufficiently strong portions 11. Side rails 8 mount rear rail 7 by securing same to the extended stop members 12. For such purpose the rear rail 7 has its end portions 17 flattened and bent at a right angle to the axis of the rail to form flanges for engagement with the outer sides of members 12 adjacent to their end faces. These flanges are welded or otherwise secured to members 12 so that the rail is supported in rearwardly offset relation with respect to stop members 12. This arrangement increases the width of the inclined faces 14 of members 12 and thus provides proper supporting areas for brackets 15. In addition, side rails 8 mount on their inner faces 18 of their rear portions 11 ear brackets 19 which are welded to said faces. Brackets 19 have their perforated ears 20 angularly offset with respect to the side rails and permit proper folding of the back frames on seat frame 3, as will readily be seen from an inspection of Figs. 1 and 3 of the drawings.

The back frames 4 and 5 which are symmetrically constructed, each comprise a tubular frame 21 of generally rectangular outline. Frame 21 has its one side rail 22, the outer one, extended downwardly beyond its bottom rail 23 and the thus extended portion 24 of said side rail flattened in a plane substantially rectangular related to the plane of frame 21 and, furthermore, bent forwardly and slightly twisted at its front portion 25 to permit pivotal engagement of a stud 26 secured to front portion 25 with a perforation 27 in each bracket 19. Preferably, portion 24 is reenforced by a tubular insert 28 extended into said portion prior to its flattening, bending and twisting.

Each of the thus constructed back frames 4 and 5 has its inner side rail 29 pivotally connected to a bracket member 30 which is mounted on the central portion of rear rail 7. This bracket member (see Figs. 8 and 9), a welded structure, embodies oppositely arranged angularly bent side plates 31, 31' connected to each other at their upper portions by a slightly V-shaped cross plate 32 and at their lower portions by a spacing and stopping plate 33, which latter is arranged between the side plates in angular relation with respect to cross plate 32. Side plates 31, 31' form with their offset portions wing or ear portions 34, 34' which are perforated at 35, 35' and pivotally support pivot means 36, 36' secured to the respective inner side rails 29 of back frames 4 and 5. Pivot means 36, 36' include pivots or studs 37, 37' angularly related to the plane of the back frames and laterally offset levers 38, 38' adapted to arrest pivotal movement of frames 4 and 5 when in predetermined positions. In unfolded position of the frame structure levers 38, 38' contact the bottom face 39 of cross plate 32 and in folded position these levers contact the top face 40 of plate 33, thus securely arresting the back frames in predetermined positions. In addition, back frames 4 and 5 are arrested at their outer ends when in unfolded position by the brackets 15 welded to the side and bottom rails 22 and 23 of said frames and engaging with their lower end portions 41 the inclined faces 14 of stop members 12.

To facilitate adjustment of the arresting of back frames 4 and 5 in folded and unfolded positions, stop levers 38, 38', stop plate 33 and end portions 41 of brackets 15 include threaded bores 42, 43 and 44 which carry threaded studs 45, 46 and 47, respectively. These studs contact the respective arresting means and may readily be adjusted to properly align back frames 4 and in their respective positions.

Having thus described my invention what I claim is:

1. In a foldable seat frame construction a seat frame having side rails with upwardly extended rear portions and a rear rail supported by said portions in offset relation with respect thereto, and symmetrically arranged back frames hinged to said side rails and rear rail and constructed to contact and rest on the said rear portions when said back frames are in predetermined positions.

2. In a foldable seat frame construction a seat frame having side rails with upwardly extended rear portions and a rear rail supported by said portions, and symmetrically arranged back frames hinged to said side rails and rear rail, said back frames including means adapted to rest on portions of said rear rail adjacent to the said rear portions of said side rails when said back frames are in predetermined positions.

3. In a foldable seat frame construction the combination of a seat frame having side rails with inwardly and upwardly extended rear portions and a rear rail supported by said rear portions in rearwardly offset relation with respect thereto, with symmetrically arranged back frames, the outer side rails of which are arranged in a vertical plane through said seat frame side rails, said back frames being hinged to said seat frame side rails and said rear rail and provided with means resting on the said rear portions when said back frames are in predetermined positions.

4. In a foldable seat frame construction the combination of a seat frame having side rails with upwardly extended rear portions and a rear rail supported by said rear portions, with a back frame hingedly connected to one of said side rails and said rear rail and including means cooperating with one of said rear portions in arresting hinge movements of said back frame when in predetermined position.

5. In a frame construction for seat structures the combination of a seat frame including side rails having upwardly extended rear portions and a rear rail supported by said rear portions in offset relation with respect thereto, with a back frame hingedly connected to said seat frame, said back frame including side rails one of which is substantially aligned with one of the side rails of said seat frame and extended and hinged to said last side rail near its rear portion, and said back frame including means cooperating with the end of one of said rear portions in stopping hinge movement of said back frame when in predetermined position.

6. In a frame construction for seat structures a seat frame with side rails having inwardly and upwardly extended rear portions and a rear rail having flanges at its opposite ends secured to the sides of said rear portions to rearwardly offset said rear rail with respect to said rear portions, a back frame hinged to one of said side rails near its rear portion and to said rear rail, and means on said back frame cooperating with said one rear portion in stopping hinge movement of the back frame when in predetermined position.

7. A frame construction for seat structures as described in claim 6, wherein said seat frame is made of tubing, wherein the said rear portions of the side rails are reenforced by tubular insets and flattened in a substantially vertical plane through said side rails, and wherein said rear rail has its end portions flattened and bent at right angles to the axis of said rear rail to provide the flanges on said rear rail.

8. In a foldable seat frame construction a seat frame including a front rail, side rails and a rear rail elevated with respect to said front rail, symmetrically arranged back frames supported by said seat frame and means hingedly coupling said back frames with said seat frame, said coupling means including pivot means on said back frames, a hinge bracket on said rear rail for pivotally supporting said pivot means and cooperating means on said bracket and pivot means for limiting the range of hinge movements of said back frames, said limiting means on said bracket and pivot means being forwardly extended with respect thereto.

9. In a foldable seat frame construction a seat frame having a front rail, side rails and a rear rail elevated with respect to said front rail, a pair of symmetrically arranged back frames supported by said seat frame, means hingedly coupling said back frames with said side and rear rails including pivot means on said back frames, a hinge bracket on said rear wall, and cooperating stopping means on said pivot means for hinge bracket forwardly offset with respect thereto for limiting the range of hinge movements of said back frames in opposite directions.

10. In a foldable seat frame construction a seat frame having a front rail, side rails with upwardly extended rear portions, and a rear rail supported by said portions in elevated position with respect to said front rail, a bracket mounted on said rear rail, and symmetrically arranged back frames hinged to said bracket and side rails so as to extend above said rear rail in spaced relation with respect thereto, said back frames including means adapted to rest on portions of said rear rail adjacent to said rear portions when said back frames are in predetermined positions.

11. In a frame construction for seat structures a seat frame made of tubing having side rails with upwardly extended rear portions reenforced by tubular insets and flattened in a vertical plane through said side rails, and a rear rail laterally attached to said rear portions in offset relations with respect thereto, a back frame hinged to said rear rail and one of said side rails near its rear portion, and means on said back frame co-operating with said one rear portion in stopping hinge movements of said back frame when in a predetermined position.

12. In a frame construction for seat structures a seat frame including side rails with inwardly and upwardly bent rear portions and a rear rail having flanges at its opposite ends secured to the sides of said rear portions to rearwardly offset said rear rail with respect to said rear portions, and a back frame hingedly connected to said seat frame, said back frame including side rails, one of which is arranged in a substantially vertical plane through one of the side rails of said seat frame and hinged to said latter side rail near its rear portion, and means on the said one side rail of said back frame extended downwardly and inwardly therefrom for co-operation with the respective rear portion of the seat frame side rail in stopping hinge movement of the back frame when in unfolded position.

13. In a frame construction for seat structures the combination of a tubular seat frame having tubular side rails flattened at their end portions and bent upwardly, and a rear rail attached to said upwardly bent end portions, with symmetrically arranged tubular back frames hinged to said seat frame, said back frames having side rails, the outer ones of which form part of the hinge connection and are downwardly extended, flattened, bent forwardly and hinged to the flattened portions of the side rails of the seat frame, and means on the side rails of said back frames adapted to engage and rest on the upwardly bent end portions of the side rails of the seat frame when said back frames are in predetermined positions.

14. In a foldable seat frame construction as described in claim 12, adjustable stops on said stopping means for proper positioning of the back frame in unfolded condition.

15. In a foldable seat construction a tubular seat frame having tubular side rails including flattened rear portions with upwardly and inwardly extended end portions, back frames having tubular side rails including flattened extensions, and a hinge connection between said rear portions and said extensions, the outer face of the outer side rail of each back frame and the outer face of the respective side rail of the seat frame being arranged in substantially the same vertical plane, and the end portions of the flattened extensions of the outer side rails of the back frames being bent inwardly into approximate alignment with the inner faces of the side rails of the seat frame.

WILLIAM H. NEELY.